(12) United States Patent
Varkey et al.

(10) Patent No.: US 10,087,717 B2
(45) Date of Patent: Oct. 2, 2018

(54) DUAL USE CABLE WITH FIBER OPTICS FOR USE IN WELLBORE OPERATIONS

(71) Applicant: Schlumberger Technology Corporation, Sugar land, TX (US)

(72) Inventors: Joseph Varkey, Sugar Land, TX (US); Willem A. Wijnberg, Houston, TX (US); Surya Simanjuntak, Winchester (GB); Sheng Chang, Sugar Land, TX (US); Jushik Yun, Sugar Land, TX (US); Burcu Unal Altintas, Richmond, TX (US); David Kim, Houston, TX (US); Maria Auxiliadora Grisanti Vigouroux, Stafford, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 815 days.

(21) Appl. No.: 14/352,394

(22) PCT Filed: Oct. 17, 2012

(86) PCT No.: PCT/US2012/060608
§ 371 (c)(1),
(2) Date: Apr. 17, 2014

(87) PCT Pub. No.: WO2013/059315
PCT Pub. Date: Apr. 25, 2013

(65) Prior Publication Data
US 2014/0367121 A1    Dec. 18, 2014

Related U.S. Application Data

(60) Provisional application No. 61/548,084, filed on Oct. 17, 2011.

(51) Int. Cl.
| | | |
|---|---|---|
| *G02B 6/44* | (2006.01) | |
| *E21B 41/00* | (2006.01) | |
| *E21B 47/12* | (2012.01) | |

(52) U.S. Cl.
CPC ............ *E21B 41/00* (2013.01); *E21B 47/123* (2013.01); *G02B 6/443* (2013.01); *G02B 6/4415* (2013.01); *G02B 6/4416* (2013.01)

(58) Field of Classification Search
CPC ....... E21B 47/123; E21B 41/00; G02B 6/443; G02B 6/4416; G02B 6/4415
(Continued)

(56) References Cited

U.S. PATENT DOCUMENTS

| | | |
|---|---|---|
| 1,921,606 A | 8/1933 | Cremer |
| 1,937,054 A | 11/1933 | Cremer |

(Continued)

FOREIGN PATENT DOCUMENTS

| | | |
|---|---|---|
| CN | 202196616 U | 4/2012 |
| DE | 2818656 A1 | 10/1979 |

(Continued)

OTHER PUBLICATIONS

European Search Report issued in European Patent Application No. 12841787.0 dated Jan. 19, 2016; 5 pages.
(Continued)

*Primary Examiner* — Akm Enayet Ullah
(74) *Attorney, Agent, or Firm* — Michael L. Flynn; Robin Nava

(57) ABSTRACT

A dual use cable includes at least one fiber optic cable encased in a metallic component that is encased in a layer of polymer material. The polymer material is surrounded by a tube or armor wire strength members embedded in one or two additional polymer material layers. A final assembly can include an outer metallic component or an outer layer of
(Continued)

polymer material. The at least one fiber optic cable transmits data and the armor wire strength members and/or metallic components transmit at least one of electrical power and data.

20 Claims, 15 Drawing Sheets

(58) Field of Classification Search
USPC .......................... 385/100, 101, 147; 166/385
See application file for complete search history.

(56) References Cited

U.S. PATENT DOCUMENTS

| | | | |
|---|---|---|---|
| 1,987,041 A | 1/1935 | Wood | |
| 2,261,742 A | 11/1941 | Matsumoto | |
| 2,604,509 A | 7/1952 | Blanchard | |
| 2,927,954 A | 3/1960 | Ellsworth | |
| 3,115,542 A | 12/1963 | Palandri | |
| 3,217,083 A | 11/1965 | Gore | |
| 3,602,632 A | 8/1971 | Ollis | |
| 3,639,674 A | 2/1972 | Stier | |
| 3,784,732 A | 1/1974 | Whitfill, Jr. | |
| 4,131,757 A | 12/1978 | Felkel | |
| 4,131,758 A | 12/1978 | Felkel | |
| 4,160,872 A | 7/1979 | Lundberg et al. | |
| 4,183,621 A | 1/1980 | Kao et al. | |
| 4,227,770 A | 10/1980 | Gunn | |
| 4,341,440 A | 7/1982 | Trezeguet et al. | |
| 4,375,313 A | 3/1983 | Anderson et al. | |
| 4,389,645 A | 6/1983 | Wharton | |
| 4,408,828 A | 10/1983 | Le Noane et al. | |
| 4,440,974 A | 4/1984 | Naudet | |
| 4,491,386 A | 1/1985 | Negishi et al. | |
| 4,504,112 A | 3/1985 | Gould et al. | |
| 4,522,464 A | 6/1985 | Thompson et al. | |
| 4,523,804 A | 6/1985 | Thompson | |
| 4,524,436 A | 6/1985 | Hall et al. | |
| 4,563,757 A | 1/1986 | Decorps et al. | |
| 4,575,831 A | 3/1986 | Decorps et al. | |
| 4,577,925 A | 3/1986 | Winter et al. | |
| 4,579,420 A | 4/1986 | Winter et al. | |
| 4,623,218 A | 11/1986 | Laurette et al. | |
| 4,645,298 A | 2/1987 | Gartside, III | |
| 4,648,919 A | 3/1987 | Diaz et al. | |
| 4,654,476 A | 3/1987 | Bamicol-Ottler et al. | |
| 4,657,342 A | 4/1987 | Bauer | |
| 4,658,089 A | 4/1987 | Guzy et al. | |
| 4,675,474 A | 6/1987 | Neuroth | |
| 4,678,274 A | 7/1987 | Fuller | |
| 4,690,497 A | 9/1987 | Occhini et al. | |
| 4,696,542 A | 9/1987 | Thompson | |
| 4,705,353 A | 11/1987 | Wagoner | |
| 4,878,733 A | 11/1989 | Winter et al. | |
| 4,915,490 A | 4/1990 | Ramsay et al. | |
| 4,976,509 A | 12/1990 | Bachmann et al. | |
| 4,979,795 A | 12/1990 | Mascarenhas | |
| 5,086,196 A | 2/1992 | Brookbank et al. | |
| 5,115,485 A | 5/1992 | Gandy | |
| 5,202,944 A | 4/1993 | Riordan | |
| 5,222,178 A | 6/1993 | Betker et al. | |
| 5,275,038 A * | 1/1994 | Sizer ................ | E21B 17/203 340/854.7 |
| 5,283,852 A * | 2/1994 | Gibler ................ | G02B 6/4486 385/102 |
| 5,329,605 A | 7/1994 | Wargotz | |
| 5,431,759 A | 7/1995 | Neuroth | |
| 5,493,626 A * | 2/1996 | Schultz ................ | E21B 17/023 174/110 R |
| 5,495,547 A | 2/1996 | Rafie et al. | |
| 5,590,803 A | 1/1997 | Kaempen | |
| 5,673,352 A * | 9/1997 | Bauer ................ | G02B 6/4403 385/103 |
| 5,761,361 A | 6/1998 | Pfandl et al. | |
| 5,787,217 A | 7/1998 | Traut et al. | |
| 5,982,965 A | 11/1999 | Cheron et al. | |
| 6,009,216 A | 12/1999 | Pruett et al. | |
| 6,030,255 A | 2/2000 | Konishi et al. | |
| 6,060,662 A | 5/2000 | Rafie et al. | |
| 6,192,983 B1 | 2/2001 | Neuroth et al. | |
| 6,195,487 B1 | 2/2001 | Anderson et al. | |
| 6,201,191 B1 | 3/2001 | Yorita et al. | |
| 6,211,467 B1 | 4/2001 | Berelsman et al. | |
| 6,236,789 B1 | 5/2001 | Fitz | |
| 6,255,592 B1 | 7/2001 | Pennington et al. | |
| 6,255,593 B1 | 7/2001 | Reede | |
| 6,260,656 B1 | 7/2001 | Orban et al. | |
| 6,262,009 B1 | 7/2001 | Rogers et al. | |
| 6,278,825 B1 | 8/2001 | Casiraghi et al. | |
| 6,281,489 B1 | 8/2001 | Tubel et al. | |
| 6,287,455 B1 | 9/2001 | Whitmore | |
| 6,297,455 B1 | 10/2001 | Wijnberg et al. | |
| 6,343,173 B2 | 1/2002 | Hordvik et al. | |
| 6,392,151 B1 | 5/2002 | Rafie et al. | |
| 6,400,873 B1 | 6/2002 | Gimblet et al. | |
| 6,403,889 B1 | 6/2002 | Mehan et al. | |
| 6,404,961 B1 * | 6/2002 | Bonja ................ | E21B 17/00 385/109 |
| 6,445,859 B1 | 9/2002 | Witt | |
| 6,463,199 B1 | 10/2002 | Quinn et al. | |
| 6,472,614 B1 | 10/2002 | Dupont et al. | |
| 6,496,627 B1 | 12/2002 | Tuminaro | |
| 6,531,694 B2 | 3/2003 | Tubel et al. | |
| 6,555,752 B2 | 4/2003 | Dalrymple et al. | |
| 6,600,108 B1 | 7/2003 | Mydur et al. | |
| 6,621,964 B2 | 9/2003 | Quinn et al. | |
| 6,714,708 B2 | 3/2004 | McAlpine et al. | |
| 6,727,828 B1 | 4/2004 | Malone et al. | |
| 6,779,927 B2 | 8/2004 | Cens et al. | |
| 6,924,436 B2 | 8/2005 | Varkey et al. | |
| 6,960,724 B2 | 11/2005 | Orlet et al. | |
| 6,968,106 B2 | 11/2005 | Chastain et al. | |
| 6,973,246 B2 | 12/2005 | Bocanegra et al. | |
| 6,978,077 B2 * | 12/2005 | Park ................ | B29D 11/00721 264/1.22 |
| 7,005,583 B2 | 2/2006 | Varkey et al. | |
| 7,009,113 B2 | 3/2006 | Varkey | |
| 7,119,283 B1 | 10/2006 | Varkey et al. | |
| 7,140,435 B2 | 11/2006 | Defretin et al. | |
| 7,170,007 B2 | 1/2007 | Varkey et al. | |
| 7,179,019 B2 | 2/2007 | Seto et al. | |
| 7,188,406 B2 | 3/2007 | Varkey et al. | |
| 7,208,855 B1 | 4/2007 | Floyd | |
| 7,235,743 B2 | 6/2007 | Varkey | |
| 7,259,331 B2 | 8/2007 | Sridhar et al. | |
| 7,288,721 B2 * | 10/2007 | Varkey ................ | H01B 7/0291 174/102 R |
| 7,294,787 B2 | 11/2007 | Varkey | |
| 7,324,730 B2 | 1/2008 | Varkey et al. | |
| 7,326,854 B2 | 2/2008 | Varkey | |
| 7,402,753 B2 | 7/2008 | Varkey et al. | |
| 7,462,781 B2 | 12/2008 | Varkey et al. | |
| 7,465,876 B2 | 12/2008 | Varkey | |
| 7,603,011 B2 | 10/2009 | Varkey et al. | |
| 7,860,362 B2 | 12/2010 | Varkey et al. | |
| 7,912,333 B2 | 3/2011 | Varkey et al. | |
| 8,213,756 B2 | 7/2012 | Herbst | |
| 8,861,911 B2 | 10/2014 | Shin et al. | |
| 8,870,858 B2 * | 10/2014 | Zerfas ................ | A61B 18/22 385/39 |
| 8,929,701 B2 | 1/2015 | Lowell et al. | |
| 8,929,702 B2 | 1/2015 | Varkey et al. | |
| 9,201,207 B2 | 12/2015 | Varkey et al. | |
| 9,488,793 B2 | 11/2016 | Register, III | |
| 9,631,224 B2 | 4/2017 | Ohga et al. | |
| 9,641,066 B2 | 5/2017 | Tsuruoka et al. | |
| 2001/0020675 A1 | 9/2001 | Tubel et al. | |
| 2001/0023614 A1 | 9/2001 | Tubel et al. | |
| 2001/0040041 A1 | 11/2001 | Pennington et al. | |
| 2002/0007948 A1 | 1/2002 | Bayne et al. | |
| 2002/0085819 A1 | 7/2002 | Stottlemyer et al. | |
| 2002/0159726 A1 | 10/2002 | Brown et al. | |
| 2003/0042019 A1 | 3/2003 | Harkins et al. | |

(56) References Cited

U.S. PATENT DOCUMENTS

| | | |
|---|---|---|
| 2003/0081917 A1 | 5/2003 | Bussear |
| 2003/0099443 A1 | 5/2003 | Kamik et al. |
| 2003/0099446 A1 | 5/2003 | Witt et al. |
| 2003/0165309 A1 | 9/2003 | Moon et al. |
| 2004/0045735 A1 | 3/2004 | Varkey et al. |
| 2004/0091215 A1 | 5/2004 | Barnoski et al. |
| 2004/0109650 A1 | 6/2004 | Kim et al. |
| 2004/0118590 A1 | 6/2004 | Head |
| 2004/0262027 A1 | 12/2004 | Kaczmarski |
| 2005/0117858 A1 | 6/2005 | Lee et al. |
| 2005/0194578 A1 | 9/2005 | Morris |
| 2005/0281517 A1 | 12/2005 | Wessels, Jr. et al. |
| 2006/0045442 A1 | 3/2006 | Varkey et al. |
| 2006/0182398 A1 | 8/2006 | Dowd et al. |
| 2006/0193572 A1 | 8/2006 | Mjelstad |
| 2006/0280412 A1* | 12/2006 | Varkey ............ H01B 7/046 385/101 |
| 2008/0024297 A1 | 1/2008 | Maki et al. |
| 2008/0031578 A1* | 2/2008 | Varkey ............ E21B 47/123 385/100 |
| 2008/0118209 A1 | 5/2008 | Varkey et al. |
| 2008/0289851 A1 | 11/2008 | Varkey et al. |
| 2009/0046983 A1 | 2/2009 | Varkey et al. |
| 2009/0196557 A1 | 8/2009 | Varkey et al. |
| 2010/0074583 A1 | 3/2010 | Varkey et al. |
| 2010/0116510 A1 | 5/2010 | Varkey et al. |
| 2011/0139447 A1 | 6/2011 | Ramos et al. |
| 2011/0234421 A1* | 9/2011 | Smith ............ E21B 47/122 340/854.3 |
| 2011/0240312 A1* | 10/2011 | Varkey ............ E21B 43/128 166/377 |
| 2012/0222869 A1* | 9/2012 | Varkey ............ E21B 23/14 166/385 |
| 2013/0084044 A1 | 4/2013 | Ertel et al. |
| 2014/0367121 A1 | 12/2014 | Varkey et al. |
| 2015/0170799 A1* | 6/2015 | Varkey ............ G02B 6/4416 174/70 R |
| 2016/0222736 A1 | 8/2016 | Varkey et al. |

FOREIGN PATENT DOCUMENTS

| | | |
|---|---|---|
| DE | 29816469 U1 | 12/1998 |
| EP | 0203249 A2 | 12/1986 |
| EP | 0342855 A2 | 11/1989 |
| EP | 0405851 A1 | 1/1991 |
| EP | 0853249 A1 | 7/1998 |
| EP | 1004914 A1 | 5/2000 |
| EP | 2520962 A1 | 11/2012 |
| GB | 2177231 A | 1/1987 |
| GB | 2275953 A | 9/1994 |
| GB | 2444362 A | 6/2008 |
| JP | 547186 A | 1/1979 |
| JP | S6029715 A | 2/1985 |
| JP | 61013208 A | 1/1986 |
| JP | 2216710 A | 8/1990 |
| JP | H03145014 A | 6/1991 |
| JP | 492110 A | 3/1992 |
| NL | 1019447 C2 | 6/2003 |
| RU | 2066871 C1 | 9/1996 |
| WO | 9641066 A1 | 12/1996 |
| WO | 9948111 A1 | 9/1999 |
| WO | 0005612 A1 | 2/2000 |
| WO | 2006131871 A2 | 12/2006 |
| WO | 2006135513 A1 | 12/2006 |
| WO | 2007066146 A2 | 6/2007 |
| WO | 2012012679 A2 | 1/2012 |
| WO | 2012015868 A2 | 2/2012 |
| WO | 2012071101 A1 | 5/2012 |
| WO | 2012170080 A1 | 12/2012 |
| WO | 2014004026 A1 | 1/2014 |
| WO | 2016122446 A1 | 8/2016 |

OTHER PUBLICATIONS

Examination Report issued in European Patent Application No. 12841787.0 dated May 9, 2016; 6 pages.

International Search Report for International Application No. PCT/US2012/060608 dated Jan. 24, 2013.

Lebedev et al., The Breakdown Strenghth of Two-Layer Dielectrics, Tomsk Polytechnic University, Tomsk, Russia #4.304.P2, High VoltageEngineering Symposium, Aug. 22-27, 1999, 4 pages.

Salama et al., Instructional Design of Multi-Layer Insulation of Power Cables, Transactions on Power systems, vol. 7, No. 1, Feb. 1992, pp. 377-382.

Extended European Search Report issued in European Patent Appl. No. 15880350.2 dated Aug. 9, 2018; 9 pages.

\* cited by examiner

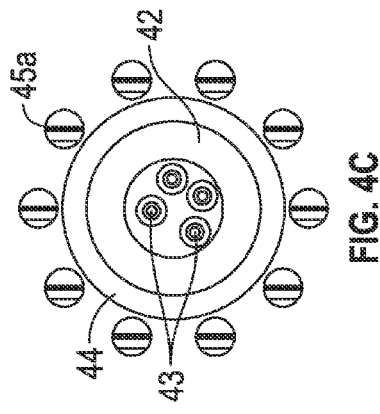
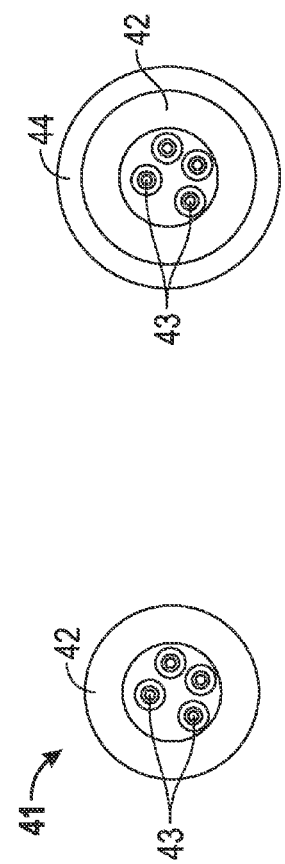
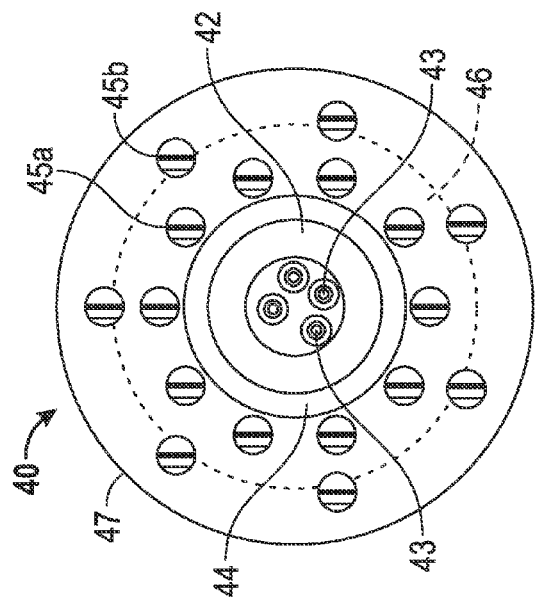
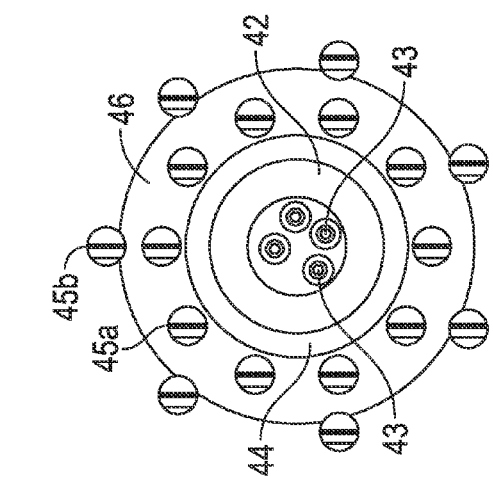
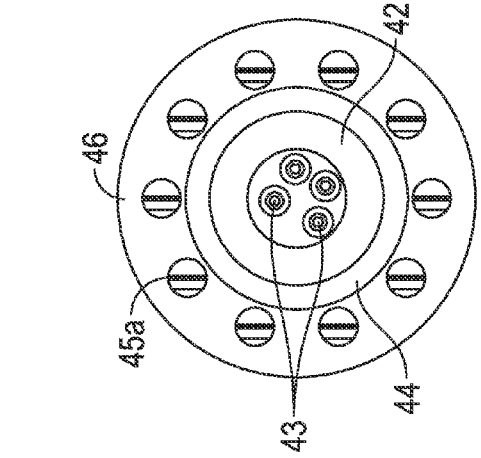

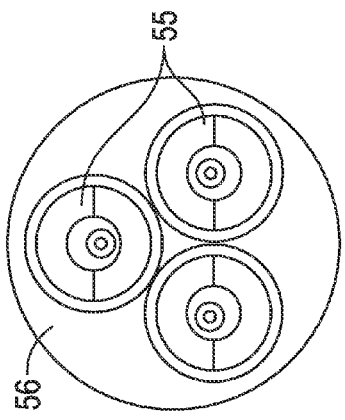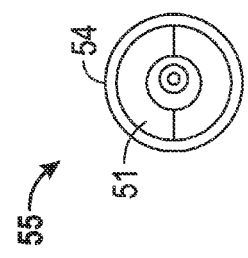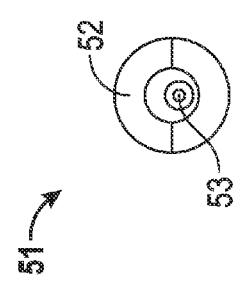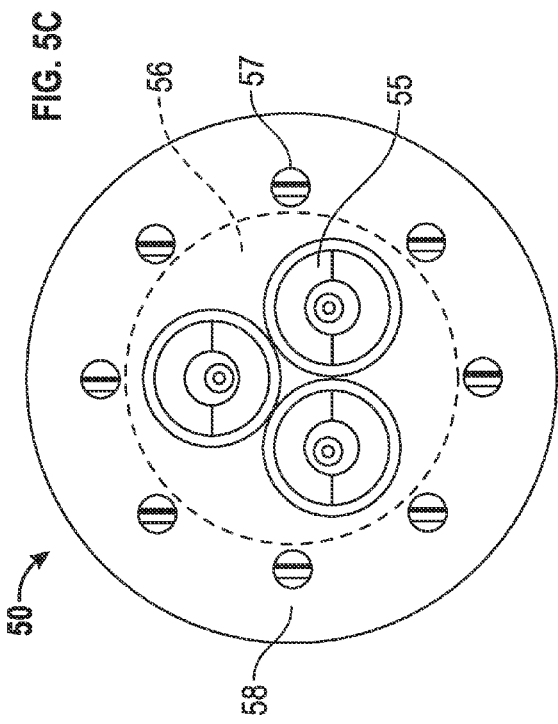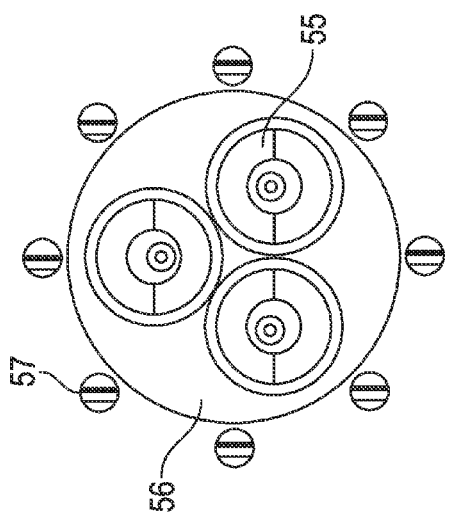

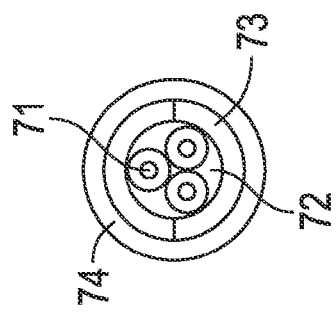
FIG. 7C
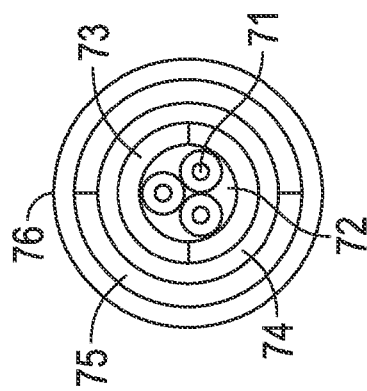
FIG. 7E
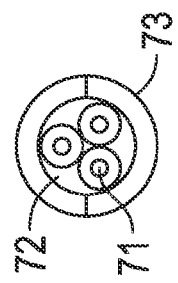
FIG. 7B
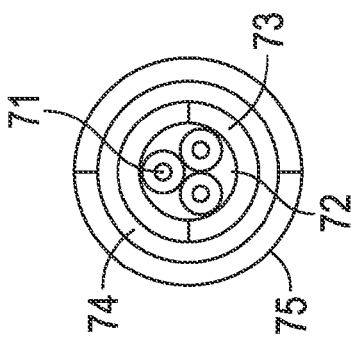
FIG. 7D
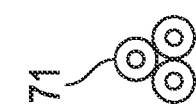
FIG. 7A

DUAL USE CABLE WITH FIBER OPTICS FOR USE IN WELLBORE OPERATIONS

BACKGROUND

The present disclosure is related in general to wellsite equipment such as oilfield surface equipment, downhole assemblies, and the like.

The statements made herein merely provide information related to the present disclosure and may not constitute prior art, and may describe some embodiments illustrating the invention. All references discussed herein, including patent and non-patent literatures, are incorporated by reference into the current application.

Coiled tubing is used in such oilwell operations as fluid pumping, fracturing, acidizing, and drilling. The fluids pumped through the coiled tubing may also used to activate downhole tools, and pressure variations in the fluid can be monitored to obtain basic information on downhole conditions. Data can be transmitted inside the coiled tube using fiber optic cables, typically consisting of small-diameter metallic tubes that contain a number of optical fibers. These cables can be inserted into the coiled tubing at the well surface by pumping them through coiled tubing at the take-up spool. When the fiber optic cable reaches the tool-end of the coiled tubing it is attached to the tool as needed.

There are issues concerning typical fiber optic cables disposed in metallic tubes used in coiled tubing, such as an increased size of the metallic tube creating stiffness and/or pumpability issues, the size of the metallic tubes limits the amount of area available for electrical power transmission, and the metallic tube's overall strength-to-weight ratio, which may limit the depth capability of the metallic tube.

It remains desirable to provide improvements in oilfield equipment and/or downhole assemblies.

SUMMARY

The fiber optic cable embodiments provide solutions to all of the above-described issues. Jacketing/tubing options include polymeric layers to mitigate the possibility of damage from pinholes. The embodiments offer greater protection of optical fibers resulting in decreased signal attenuation and optical fiber failure. The embodiments are also more resistant to collapse under torque stresses.

The embodiments described herein provide fiber optic cables including polymers to form crush-resistant tubes that better protect the optical fibers. All embodiments include polymeric jacketing to substantially eliminate optical fiber damage from fluids entering through pinholes in a metallic outer tube. All embodiments also include segregated, insulated metallic components that can be used as electrical conductors.

A method for performing an operation in a wellbore penetrating a subterranean formation utilizing a dual use cable for transmitting electrical power and data in wellbore operations, comprises method for performing an operation in a wellbore providing a dual use cable, the dual use cable comprising at least one longitudinally extending optical fiber a first metallic component surrounding the at least one optical fiber a polymer material layer surrounding and encasing the first metallic component wherein the at least one optical fiber is adapted to transmit data and the first metallic component is adapted to transmit at least one of electrical power and data, and a second metallic component formed as at least one of an outer metallic tube and a plurality of armor wire strength members and another polymer material layer surrounding and encasing the polymer layer material, the second metallic component embedded in the another polymer material layer, disposing the dual use cable in the wellbore, and performing at least one wellbore operation with the cable. In an embodiment, the at least one optical fiber is positioned in a fiber optic micro-cable having at least another optical fiber. In an embodiment, the first metallic component is one of a tube, a split-tube and a slotted armor or copper wire.

In an embodiment, the at least one of the polymer material layer and the another polymer material layer is formed of a CFR-Fluoropolymer, non-reinforced fluoropolymer, or PEEK material. In an embodiment, the wellbore operation comprises at least one of a fluid pumping operation, a fracturing operation, an acidizing operation, a drilling operation, and a coiled tubing operation. In an embodiment, the method further comprises encasing the dual use cable having the armor wire strength members embedded in the another polymer material layer in a metallic tube. In an embodiment, the method further comprises disposing the dual use cable in a length of coiled tubing and wherein the dual use cable does not substantially reduce the amount of internal area or volume within the coiled tubing for performing the wellbore operation. In an embodiment, the method further comprises forming the first metallic component from an inner split-tube and an outer split-tube spaced apart by a layer of polymer material. In an embodiment, the method further comprises forming the first metallic component from an inner tube and an outer split-tube.

A dual use cable for transmitting electrical power and data in wellbore operations comprises at least one longitudinally extending optical fiber a first metallic component surrounding the at least one optical fiber, a polymer material layer surrounding and encasing the first metallic component wherein the at least one optical fiber is adapted to transmit data and the first metallic component is adapted to transmit at least one of electrical power and data, and a second metallic component surrounding and encasing the polymer material layer, the second metallic component formed as at least one of an outer metallic tube and a plurality of armor wire strength members embedded in another polymer material layer, wherein the dual use cable is disposed within a length of coiled tubing and wherein the dual use cable does not substantially reduce the amount of internal area or volume within the coiled tubing for performing the wellbore operation. In an embodiment the cable further comprises a plurality of the longitudinally extending optical fibers, the first metallic component being a thin metallic tube, the polymer material layer being formed of a CFR-Fluoropolymer, non-reinforced fluoropolymer, or PEEK material, and the second metallic component being a metallic tube.

In an embodiment, the at least one longitudinally extending optical fiber is a fiber optic micro-cable, the first metallic component is a split-tube, and the second metallic component is two layers of armor wire strength members embedded in polymer material. The cable may further comprise an outer metallic tube surrounding the second metallic component. In an embodiment, the cable further comprises plurality of the longitudinally extending optical fibers, the first metallic component being a metallic tube, and the second metallic component being two layers of armor wire strength members embedded in polymer material. In an embodiment, the cable further comprises a plurality of the longitudinally extending optical fibers, the first metallic component being a plurality of slotted armor wires each receiving an associated one of the optical fibers in a longitudinally extending slot, and the second metallic component being a layer of armor wire strength members embedded in polymer material. In an embodiment, the cable further comprises a plurality of the longitudinally extending optical fibers, the first metallic component being a first split-tube surrounding the optical fibers and a second split-tube surrounding the first split-tube, and the second metallic component being two layers of armor wire strength members embedded in polymer material. In an embodiment, the cable further comprises a plurality of the longitudinally extending optical fibers, the first metallic component being a tube surrounding the optical fibers and a split-tube surrounding the tube, and the second metallic component being two layers of armor wire strength members embedded in polymer material and surrounded by a polymer outer jacket. In an embodiment, the cable is adapted to perform at least one wellbore operation. The wellbore operation may be performed in conjunction with at least one coiled tubing operation.

BRIEF DESCRIPTION OF THE DRAWINGS

These and other features and advantages will be better understood by reference to the following detailed description when considered in conjunction with the accompanying drawings.

FIGS. 4A through 4F are radial cross-sectional views of a third embodiment of a fiber optic cable according to the disclosure.

FIGS. 5A through 5E are radial cross-sectional views of a fourth embodiment of a fiber optic cable according to the disclosure.

FIGS. 7A through 7E are radial cross-sectional views of a sixth embodiment of a fiber optic cable core according to the disclosure.

DETAILED DESCRIPTION

Figure 1:
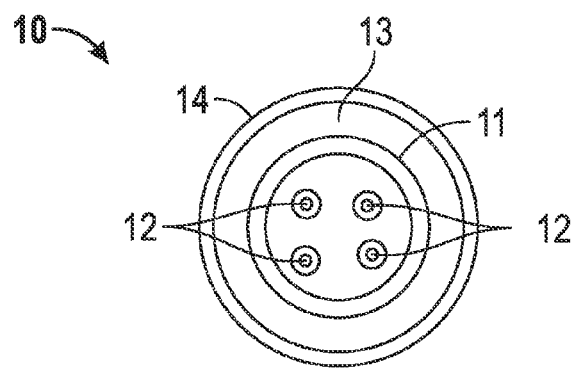
FIG. 1 is a radial cross-sectional view of a first embodiment of a fiber optic cable according to the disclosure.

While the cable embodiments are only shown in cross-sectional views, it is to be understood that the components of the cables extend in a longitudinal direction between the ends of the cables. Referring now to FIG. 1, there is shown a first embodiment fiber optic cable 10. The first embodiment cable 10 differs from conventional embodiments in that there is a layered construction of its outer tube. Instead of a solid metallic tube, the cable 10 begins with a first metallic component in the form of an inner thin metallic tube 11 which encases a number of optical fibers 12. Although four optical fibers 12 are shown, more or less fibers can be used. A jacket or layer 13 of polymer material, such as, but not limited to, carbon-fiber-reinforced (CFR) Fluoropolymer material is extruded over the central metallic tube 11. A second metallic component in the form of an outer metallic tube 14 is drawn over the CFR-Fluoropolymer layer to complete the cable 10. The layered tube embodiment 10 offers greater crush and torque resistance than a single solid metallic tube. The polymeric layer 13 provides a seal against any fluid penetrating through pinholes in the outer metallic tube 14. In addition, because the polymer material provides a layer 13 of electrical insulation between the metallic tubes 11 and 14, the two metallic tubes can be used as electrical conductors, with the inner metallic tube 11 used as a positive conductor and the outer metallic tube 14 used as the return.

Referring now to FIGS. 2A through 2G, there is shown a second embodiment fiber optic cable 20, during steps of a cable construction method. A fiber-optic micro-cable 21 is placed within a first metallic component in the form of a split-tube conductor 22 surrounded by a second metallic component in the form of a caged armor 23a, 23b surrounded by a third metallic component in the form of an outer metallic tube 24. The split tube 22 can be used to provide electrical power to downhole tools with the armor wires 23a and/or 23b used as a return path. The numbers and arrangement of the armor wires 23a and 23b in two strength member layers are utilized to minimize torque imbalance. A "caged" in a CFR-Fluoropolymer jacketing system adds strength to the cable 20 and protects against damage from fluids penetrating through pinholes in the outer metallic tube 24. A method of construction of the cable 20 is illustrated in FIGS. 2A-2G as described below.

Figure 2A:
FIGS. 2A through 2G are radial cross-sectional views of a second embodiment of a fiber optic cable according to the disclosure.
Figure 2B:
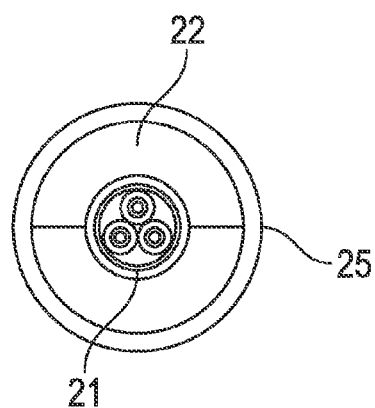

The method of construction begins with a step of providing the fiber-optic micro-cable 21 which serves as the cable core, as shown in FIG. 2A (though illustrated as a three fiber cable those skilled in the art will appreciate that a four-fiber or other configuration core may also be used). In a second step shown in FIG. 2B, the split tube 22 made of a conductive metal (such as, copper) is placed over the micro-cable cable core 21 and a first layer 25 of polymer material is extruded over the split tube 22 to hold the two split halves in place. In a third step shown in FIG. 2C, an inner layer of the armor wire strength members 23a is cabled at a lay angle over the polymer-coated split tube 22. In a fourth step shown in FIG. 2D, a second polymer layer 26 of CFR-Fluoropolymer material, or other suitable polymer material, is extruded over and encases the armor wire strength members 23a.

Figure 2C:
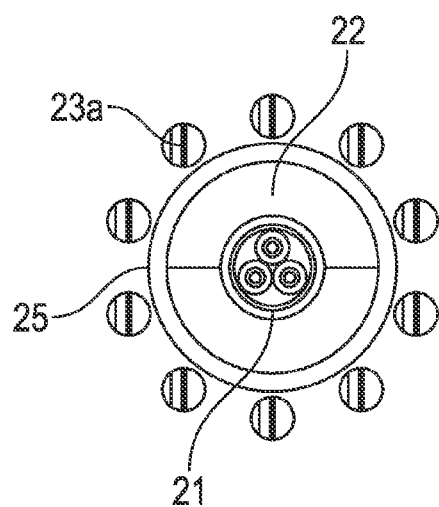
Figure 2D:
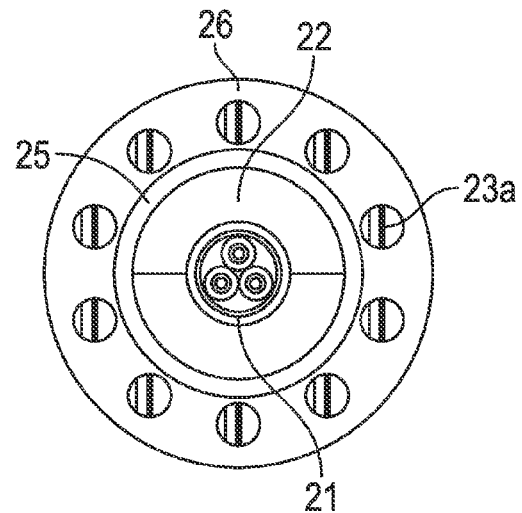
Figure 2E:
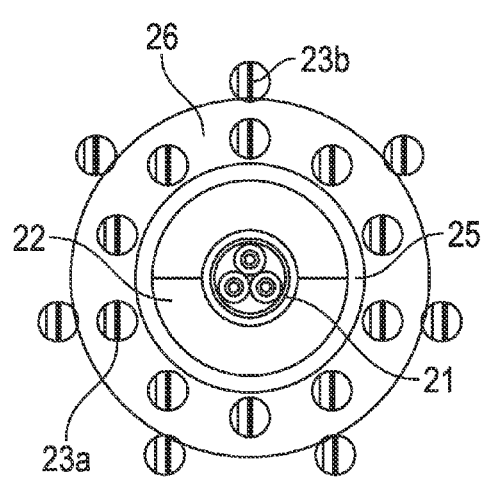
Figure 2F:
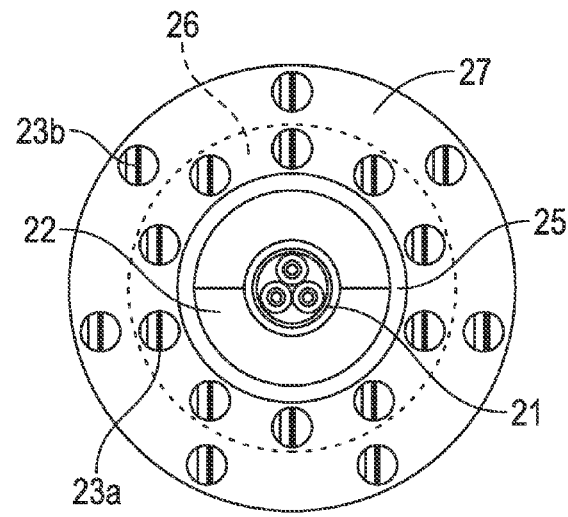

As shown in FIG. 2E, a second layer of the armor wire strength members 23b is cabled (at a counter-helical lay angle to the first armor wire layer 23a shown in FIG. 2C) over the CFR-Fluoropolymer layer 26 in a fifth step of the method. FIG. 2F shows a sixth step in which a third polymer layer 27 (a second layer of the CFR-Fluoropolymer material) is extruded over and encases the second layer of armor wires 23b. The two layers 26 and 27 of CFR-Fluoropolymer material bond to each other and to the polymer material first layer 25 coating the split tube 22 to create a bonded jacketing system to complete a cable 20a. As an option, the metallic tube 24 can be drawn over the outer CFR-Fluoropolymer layer 27 to enhance stiffness and form the cable 20 as shown in FIG. 2G.

Figure 2G:
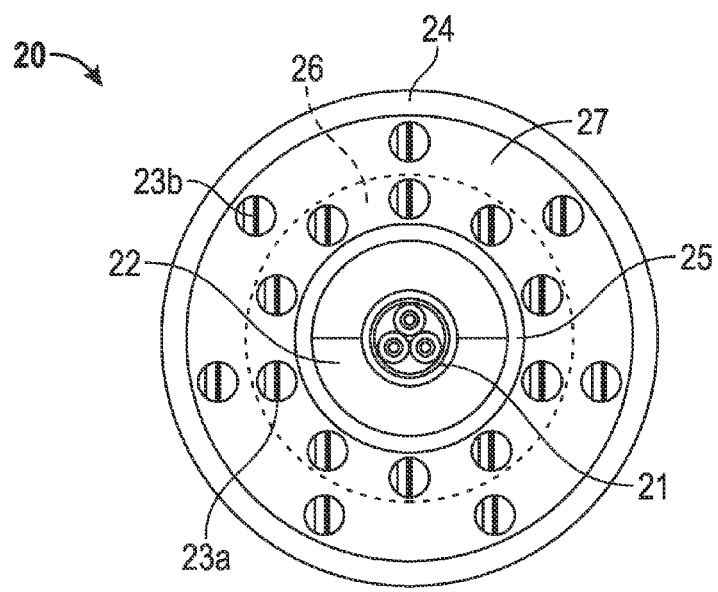
Figure 3A:
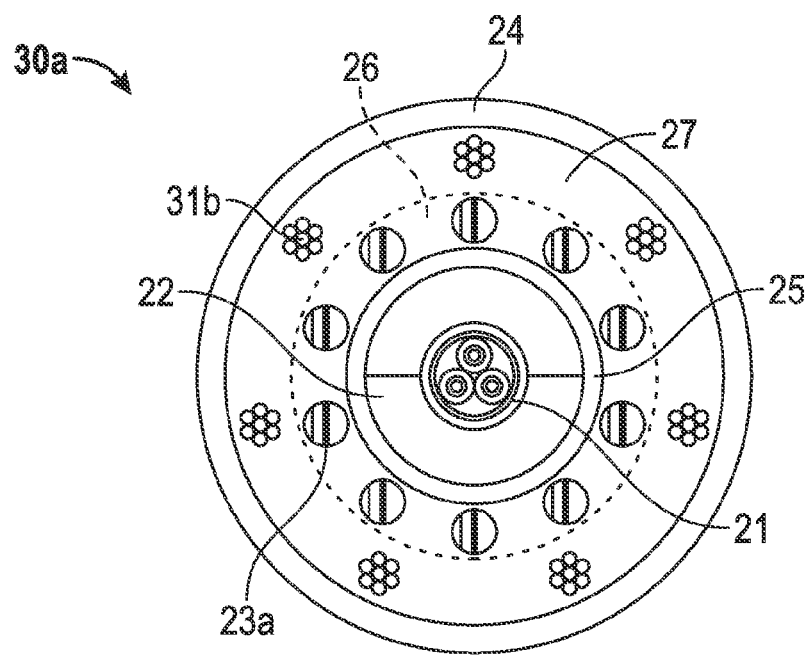
FIGS. 3A and 3B are radial cross-sectional views of variations of the second embodiment fiber optic cable shown in FIG. 2G.
Figure 3B:
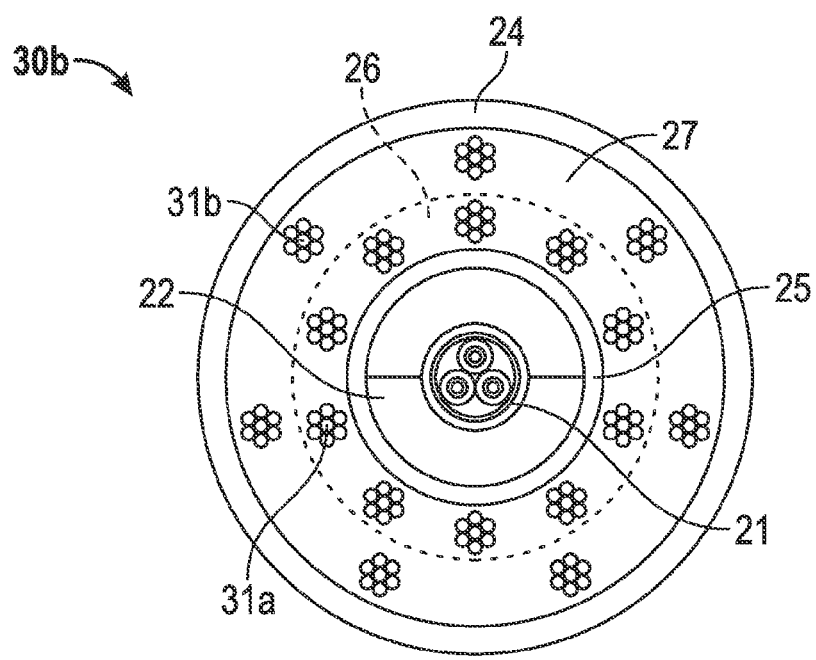

There is shown in FIGS. 3A and 3B variations of the second embodiment cable 20 shown in FIG. 2G. A cable 30a shown in FIG. 3A comprises essentially the same construction as the cable 20 shown in FIG. 2G with the exception of the outer layer of strength members 23b added to the cable 20 in Step 5. In the cable 30a, these outer strength members 23b comprise stranded wire 31b. Similarly, a cable 30b shown in FIG. 3B is of the same construction as the cable 20 as shown in FIG. 2G with the exceptions that the armor wire strength members 23a and 23b added to the cable 20 in Steps 3 and 5 respectively are replaced with stranded wire strength members 31a and 31b respectively.

Referring now to FIGS. 4A through 4F, there is shown a third embodiment fiber-in-metal-tube (FIMT) based cable 40, during steps of a cable construction method. A cable core is surrounded by a bonded caged-armor jacketing system, discussed in more detail below. A metallic portion of the FIMT cable 40 may be used to provide electrical power to downhole tools with armor wires used as a return path. The numbers and arrangement of the armor wires in two strength member layers are selected to minimize torque imbalance. The caged CFR-Fluoropolymer jacketing system adds strength to the cable and protects against the cable damage from fluids. As illustrated in FIGS. 4A through 4F, the cable 40 may be constructed according to the following method steps.

The construction begins with a first step wherein the FIMT cable 41 which serves as the cable core is provided as shown in FIG. 4A. The cable core 41 includes a first metallic component in the form of a metallic tube 42 surrounding a plurality of optical fibers 43. In a second step shown in FIG. 4B, a layer 44 of polymer material is extruded over the FIMT core 41 and the metallic tube 42 can be used as an insulated conductor. An inner layer of armor wire strength members 45a is cabled at a lay angle over the FIMT core 41 in a third step, as shown in FIG. 4C, and the inner layer of armor wires can be used as electrical conductors. In a fourth step shown in FIG. 4D, a second layer 46 of CFR-Fluoropolymer material, or other suitable polymer material, is extruded to encase the armor wire strength members 45a. In a fifth step shown in FIG. 4E, a second layer of armor wire strength members 45b is cabled (at a counter-helical lay angle to the first armor wire layer 45a shown in FIG. 4C) over the CFR-Fluoropolymer layer 46 and these outer armor wires can be used as electrical conductors. Either or both of the layers of armor wire strength members form a second metallic component. In a final sixth step shown in FIG. 4F, a third polymer layer 47 of CFR-Fluoropolymer material is extruded over and encases the second layer of armor wires 45b. The two layers 46 and 47 of CFR-Fluoropolymer material bond to each other and to the first polymer layer 44 coating the FIMT cable 41 to create a bonded jacketing system.

Referring now to FIGS. 5A through 5E, there is shown a fourth embodiment fiber optic cable 50 wherein individual optical fibers contained in insulated split-tube conductors are cabled together in a CFR-Fluoropolymer material jacket to serve as the cable core, surrounded by a bonded caged-armor jacketing system, discussed in more detail below. The metallic portions of the split-tubes can be used to provide electrical power to downhole tools. The armor wires also can be used as potential return paths. "Caging" the armor wires in a CFR-Fluoropolymer jacketing system adds strength to the cable and protects against damage from fluids. The cable 50 is constructed according to the following method steps of the invention.

The cable 50 begins with a cable core 51 having a first metallic component in the form of a split-tube conductor 52 encasing a single optical fiber 53 provided as shown in FIG. 5A. A first layer 54 of polymer material is extruded over the split-tube 52, creating an insulated conductor 55 in a second step, as shown in FIG. 5B. A number of these insulated split-tube electrical/fiber-optic conductors 55 are cabled together in an extrusion of a second polymer layer 56 of CFR-Fluoropolymer material to create a cable core in a third step, as shown in FIG. 5C. A second metallic component in the form of a layer of armor wire strength members 57 is cabled at a lay angle over the cable core in a fourth step shown in FIG. 5D, and these armor wires 57 can also be used as electrical conductors. In a fifth step shown in FIG. 5E, a third polymer layer 58 of CFR-Fluoropolymer material, or other suitable polymer material, may be extruded over to encase the armor wire strength members 57. The outer layer 58 of CFR-Fluoropolymer material bonds to the core to create a bonded jacketing system. A second layer of solid armor may be placed counter helix to the armor 57, followed by an outer CFR-Fluoropolymer jacket may also be given to the cable 50 similar to cable 20 and 40.

Referring now to FIGS. 6A through 6E, there is shown a fifth embodiment fiber optic cable 60 wherein individual optical fibers placed in slots formed in insulated slotted armor or copper wires can be cabled together in a CFR-Fluoropolymer material jacket to serve as the cable core, surrounded by a bonded, caged-armor jacketing system, discussed in more detail below. The metallic portions of the slotted armor or copper wires can be used to provide electrical power to downhole tools or the like. The caged armor wires may also be used as potential return paths. "Caging" the armor wires in a CFR-Fluoropolymer jacketing system adds strength to the cable and protects against damage from fluids. As illustrated in FIGS. 6A through 6E, the cable 60 can be constructed as described in the following steps of the method.

Figure 6C:
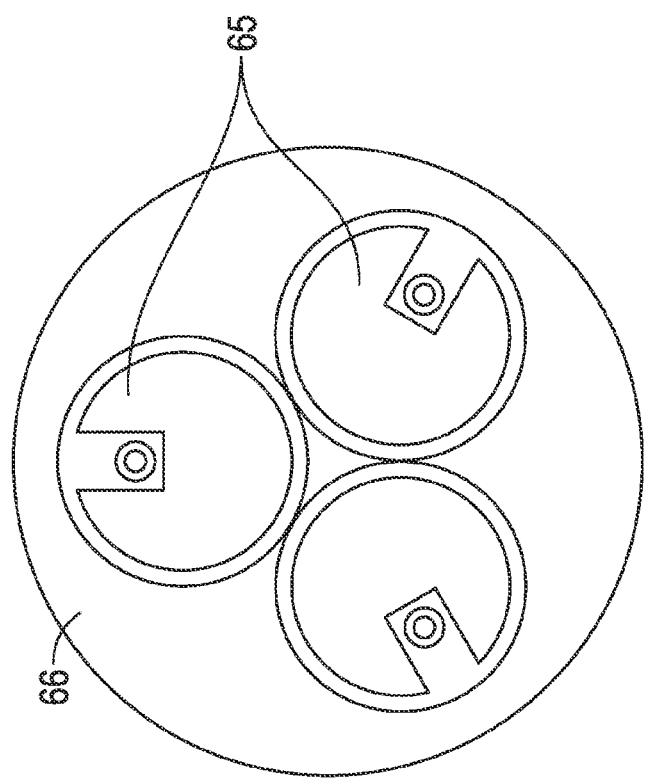
FIGS. 6A through 6E are radial cross-sectional views of a fifth embodiment of a fiber optic cable according to the disclosure.
Figure 6B:
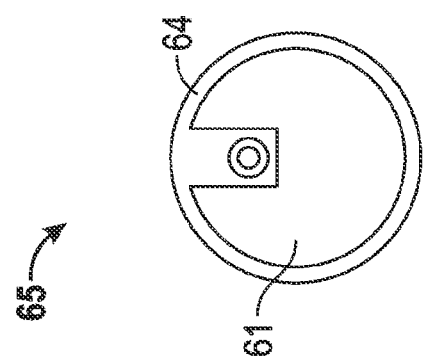
Figure 6A:
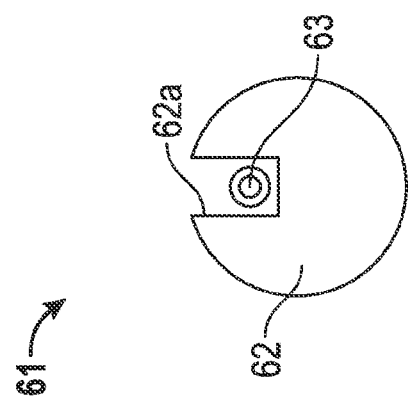
Figure 6E:
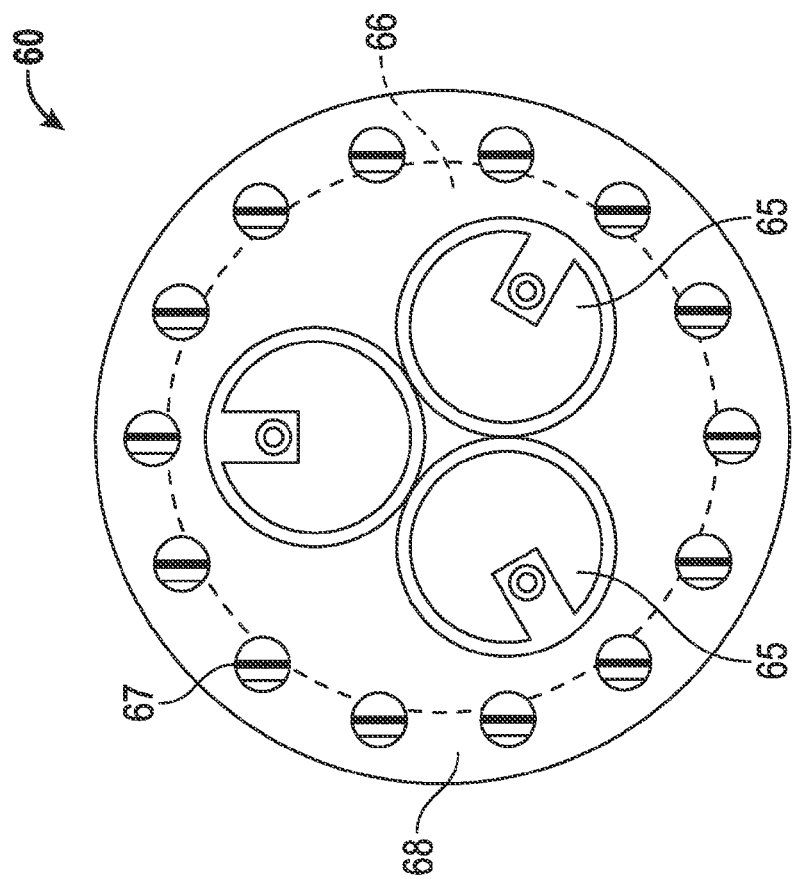
Figure 6D:
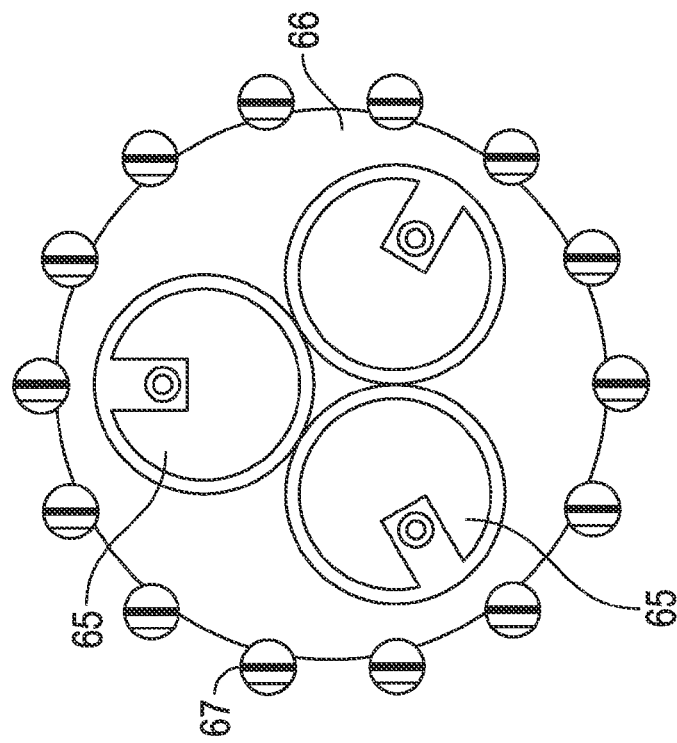

The cable 60 begins with a first step shown in FIG. 6A wherein a cable core 61 is formed by placing a single optical fiber 63 in a longitudinally extending slot 62a of a first metallic component in the form of a slotted armor or copper wire 62. In a second step shown in FIG. 6B, a first layer 64 of polymer material is extruded over the cable core 61 creating an insulated conductor 65. Several of these insulated conductors 65 are cabled together in a second polymer layer 66 extrusion of a CFR-Fluoropolymer material to create a cable core according to a third step as shown in FIG. 6C. In a fourth step shown in FIG. 6D, a second metallic component in the form of a layer of armor wire strength members 67 is cabled at a lay angle over the cable core and these armor wires can also be used as electrical conductors. In a fifth step shown in FIG. 6E, a third polymer layer 68 of CFR-Fluoropolymer material, or other suitable polymer material, is extruded over to encase the armor wire strength members 67. The outer CFR-Fluoropolymer layer 68 bonds to the core to create a bonded jacket for the cable 60. A second layer of solid armor may be placed counter helix to the armors 67, followed by an outer CFR-Fluoropolymer jacket may also be given to the cable 60 similar to cable 20 and 40.

Referring now to FIGS. 7A through 7E, a sixth embodiment cable core 70 retains the strength and flexibility of the previous embodiments, first through sixth, and adds the ability to return electrical current on a separate conductor rather than on the armor wire strength members. In the cable core 70, three or more optical fibers can be placed in a soft polymer material between two layers of split tube conductors. The layers of split tube conductors are separated by layers of insulation so that each layer can be used as a separate conductor. The cable core 70 is completed by encasing the cable core in a polymeric jacketing system consisting of a short-fiber-reinforced polymer material with multiple layers of solid and/or stranded armor wires "caged" inside the polymer material. This embodiment allows current to be passed down one split-tube conductor and returned on the other. In this embodiment, the electrical return on the armor wires is not necessary. Referring now to FIGS. 7A through 7E, the basic assembly process is described as follows.

In a first step shown in FIG. 7A, a number of optical fibers 71 are placed at a center of the cable core 70. In a second step shown in FIG. 7B, the optical fibers 71 are encased in a soft polymer material 72 as two halves of a split-tube conductor 73 are brought together to encase the optical fibers 71 and the soft polymer material 72. FIG. 7C shows a third step in which a first layer 74 of polymer material is extruded over the split-tube conductor 73 to hold the two halves together and insulate the conductor. In a fourth step shown in FIG. 7D, a second, larger-diameter split-tube conductor 75 has a set of conductor halves placed over the first polymer layer 74. FIG. 7E shows a fifth step in which a second layer 76 of polymer material is extruded over the second split-tube conductor 75 to hold the two halves together and insulate the outer conductor of the cable core 70. The split-tube conductors 73 and 75 form a first metallic component.

Figure 8B:
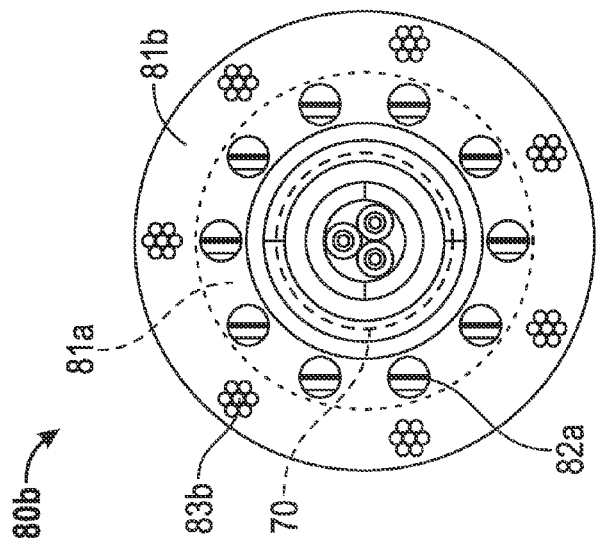
FIGS. 8A through 8C are radial cross-sectional views of variations of a fiber optic cable incorporating the core shown in FIG. 7E.
Figure 8C:
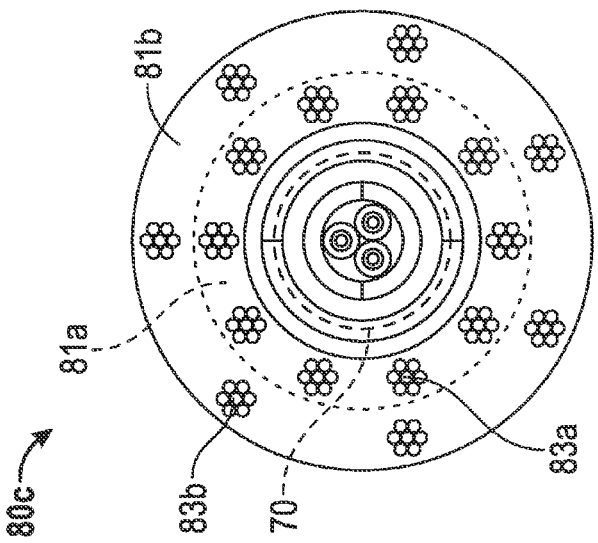
Figure 8A:
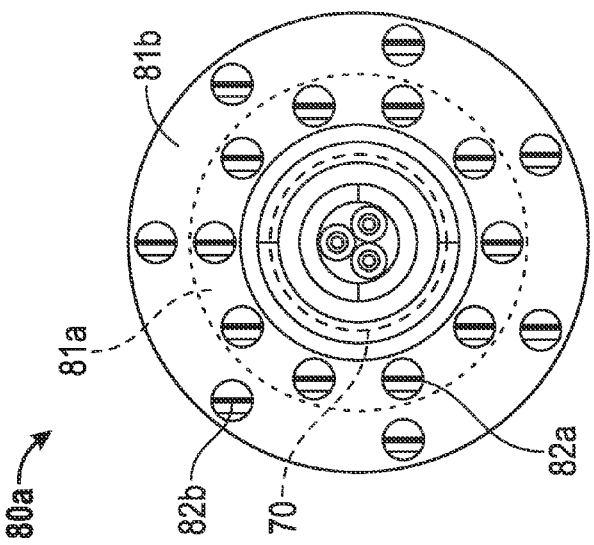

Referring now to FIGS. 8A through 8C, the caged armor polymeric jacketing system (using an amended polymer material such as, but not limited to, CFR-Fluoropolymer material) described above can be applied over the completed cable core 70 of FIG. 7E, as described above, to produce several possible arrangements of an armor jacketing system. As shown in FIG. 8A, a fiber optic cable 80a is formed from the core 70 encased in an inner layer 81a of a polymer material and an outer layer 81b a polymer material. Embedded in the layers 81a and 81b are solid armor wire strength members 82a and 82b respectively. As shown in FIG. 8B, a fiber optic cable 80b is formed similar to the cable 80a except that the outer layer of solid armor wire strength members 82b is replaced with an outer layer of stranded armor wire strength members 83b. As shown in FIG. 8C, a fiber optic cable 80c is formed similar to the cable 80b except that the inner layer of solid armor wire strength members 82a is replaced with an inner layer of stranded armor wire strength members 83a. The combinations of the armor wire strength members 82a, 82b, 83a and 83b form a second metallic component.

Referring now to FIGS. 11A through 11H, a seventh embodiment cable core 110 is shown. In the cable core 110, three or more optical fibers (four are illustrated) can be placed in a soft polymer material between a layer of split tube conductors. Drawn over the split tube conductors is a metallic tube, separated from the split tube conductor by a layers of insulation. The cable core 110 is completed by encasing the cable core in a polymeric jacketing system consisting of a short-fiber-reinforced polymer material with multiple layers of solid and/or stranded armor wires "caged" inside the polymer material. This embodiment enhances the stiffness of the overall cable and cable core, discussed in more detail below. Referring now to FIGS. 11A through 11H, the basic assembly process is described as follows.

Figure 11C:
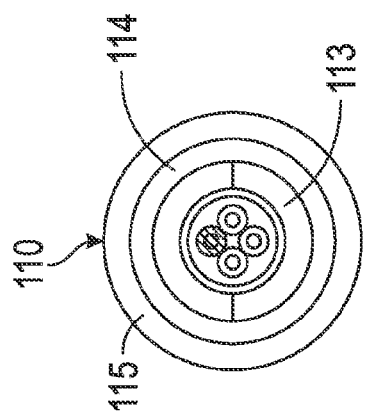
FIGS. 11A through 11H are radial cross-sectional views of an embodiment of a cable.
Figure 11B:
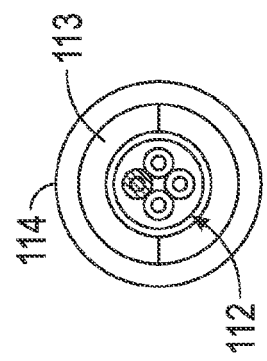
Figure 11A:
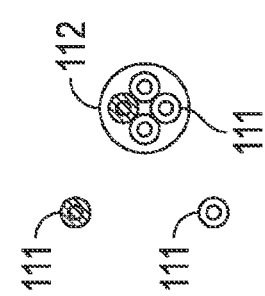
Figure 11E:
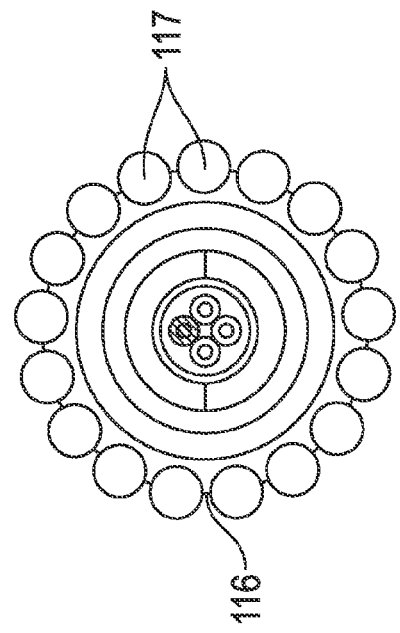
Figure 11D:
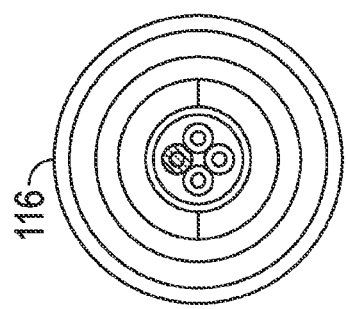
Figure 11H:
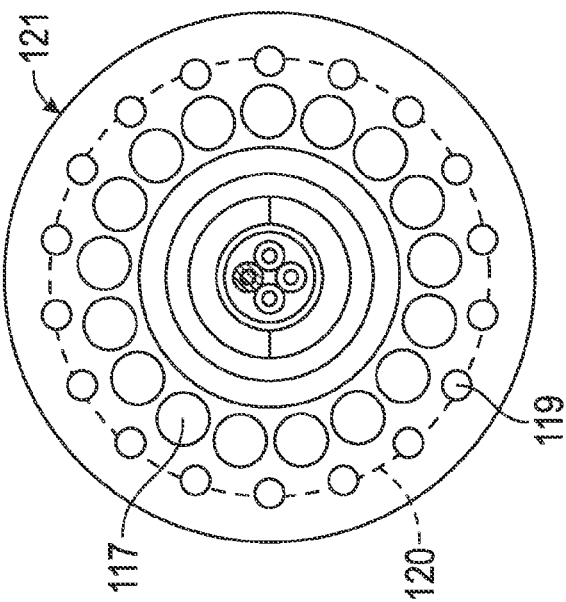
Figure 11G:
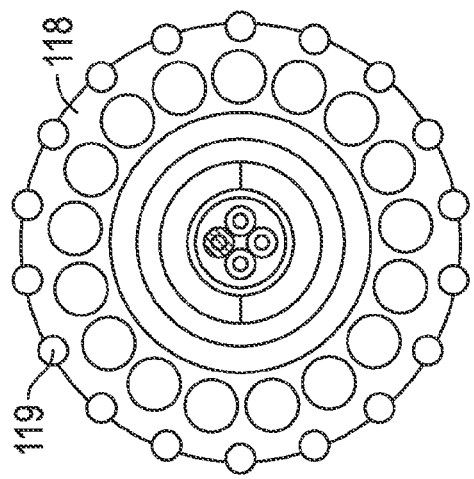
Figure 11F:
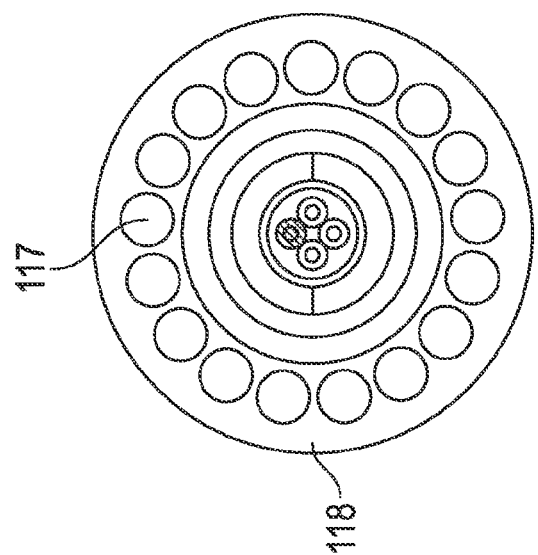

Referring now to FIG. 11A, the cable 121 begins with a first step shown in FIG. 11A with a cable core 110 having a first metallic component in the form of a split-tube conductor 113 encasing a plurality optical fibers 111 surrounded by a polymeric layer 112 provided as shown in FIG. 11A. A first layer 114 of polymer material is extruded over the split-tube 113, as shown in FIG. 11B, over which is drawn a metallic tube 115, formed from Inconel or any other suitable metallic material to provide stiffness to the cable core 110 as shown in FIG. 11C. A second polymer layer 116 of CFR-Fluoropolymer material is extruded over the cable core 110, as shown in FIG. 11D. A second metallic component in the form of a layer of armor wire strength members 117 is cabled at a lay angle over the cable core in a fourth step shown in FIG. 11E. In a step shown in FIG. 11F, a third polymer layer 118 of CFR-Fluoropolymer material, or other suitable polymer material, may be extruded over to encase the armor wire strength members 117. The layer 118 of CFR-Fluoropolymer material bonds to the core to create a bonded jacketing system. A third metallic component in the form of a second layer of solid armor wire strength members 119 may be placed counter helix to the armor 117, followed by an outer CFR-Fluoropolymer jacket 120 to complete the cable 121.

Referring to FIG. 12A through 12H, Referring now to FIGS. 11A through 11H, an eighth embodiment cable core 130 is shown. In the cable core 130, three or more optical fibers (four are illustrated) can be placed in a soft polymer material between a layer of split tube conductors. The layer of split tube conductors is separated from a serve layer by a layer of insulation so that each layer can be used as a separate conductor. The cable core 130 is completed by encasing the cable core in a polymeric jacketing system consisting of a short-fiber-reinforced polymer material with multiple layers of solid and/or stranded armor wires "caged" inside the polymer material. This embodiment allows current to be passed down one split-tube conductor and returned on the other. In this embodiment, the electrical return on the armor wires is not necessary. Referring now to FIGS. 12A through 12H, the basic assembly process is described as follows.

Figure 12A:
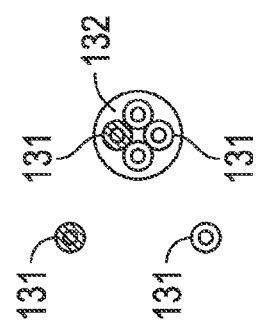
FIGS. 12A through 12H are radial cross-sectional views of an embodiment of a cable.
Figure 12B:
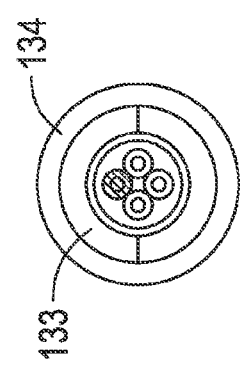
Figure 12C:
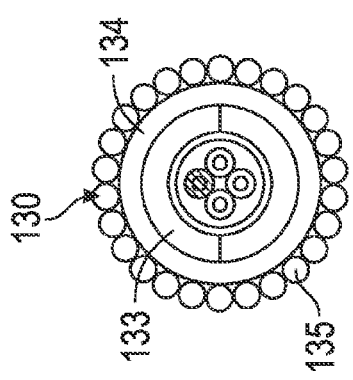
Figure 12D:
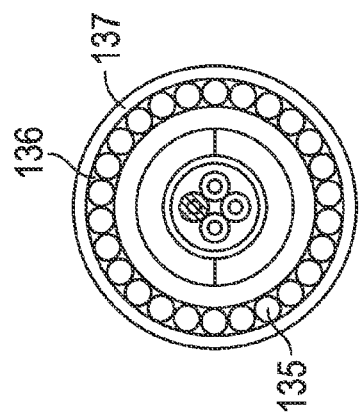
Figure 12E:
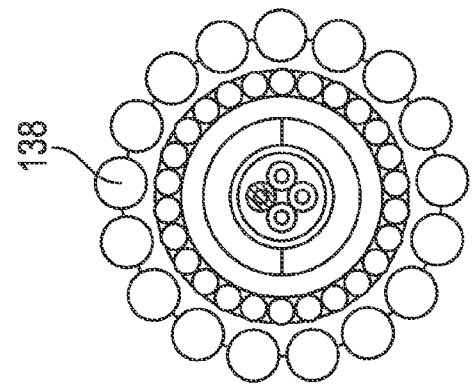
Figure 12H:
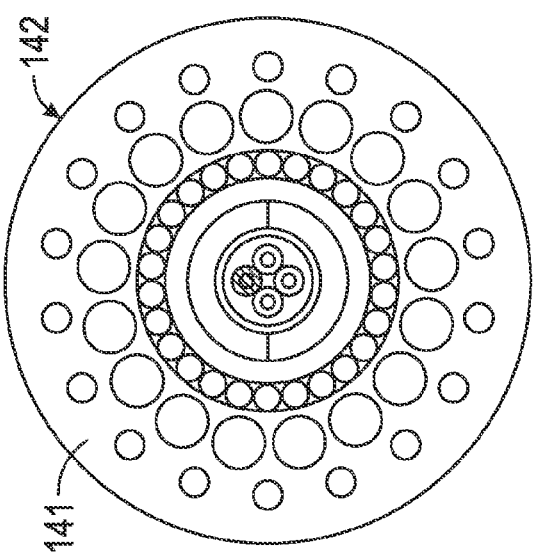
Figure 12G:
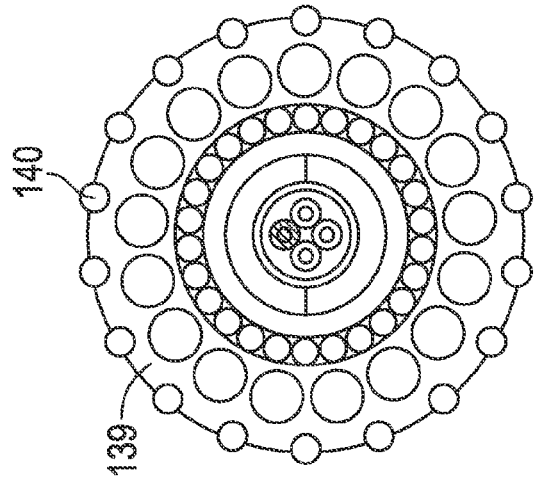
Figure 12F:
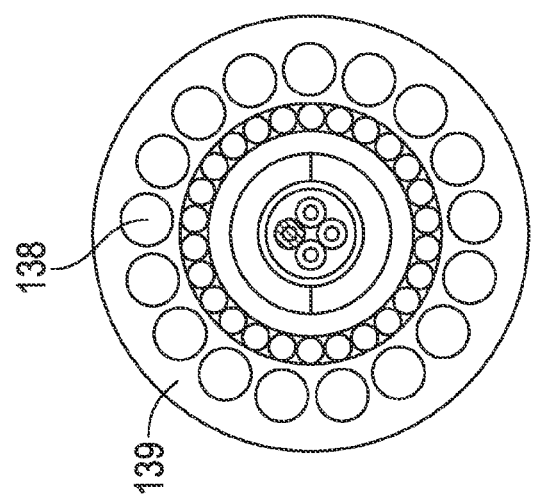

Referring now to FIG. 12A through 12H, the cable 142 begins with a cable core 130 having a first metallic component in the form of a split-tube conductor 133 encasing a plurality of optical fibers 131 surrounded by a polymer material 132 provided as shown in FIGS. 12A and 12B. A first layer 134 of polymer material is extruded over the split-tube 133, as shown in FIG. 12B, over which is cabled a serve conductor layer 135, formed from copper or another metallic material to provide another conductor to the cable core 130 as shown in FIG. 12C. A second polymer layer 136 of CFR-Fluoropolymer material and an optional third polymer layer 137 is extruded over the cable core 130, as shown in FIG. 12D. A second metallic component in the form of a layer of armor wire strength members 138 is cabled at a lay angle over the cable core shown in FIG. 12E. In a step shown in FIG. 12F, a third polymer layer 139 of CFR-Fluoropolymer material, or other suitable polymer material, may be extruded over to encase the armor wire strength members 138. The layer 139 of CFR-Fluoropolymer material bonds to the core to create a bonded jacketing system. A third metallic component in the form of a second layer of solid armor wire strength members 140 may be placed counter helix to the armor 138, followed by an outer CFR-Fluoropolymer jacket 141 to complete the cable 142.

Figure 9:
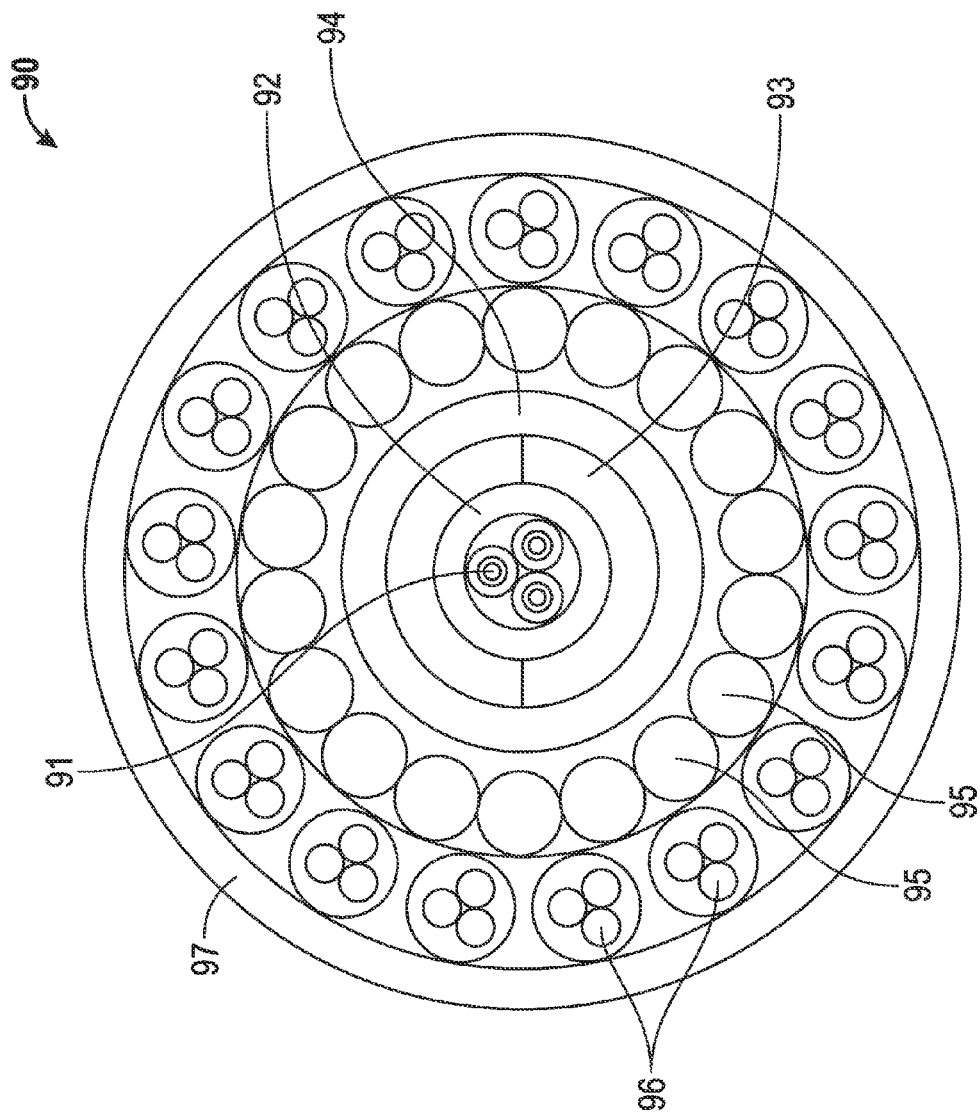
FIG. 9 is a radial cross-sectional view of a further embodiment fiber optical cable according to the disclosure.

Referring to FIG. 9, another embodiment fiber optic cable 90 is shown. The cable 90 includes a cable core formed as an optical fiber unit or fiber-optic micro cable comprising three optical fibers 91 enclosed in a metallic tube 92 or the like. As an example, the optical fiber unit is formed of the optical fibers 91 of 50mm diameter to form a unit of about 0.030" or 0.75 mm in diameter. Disposed about the optical fiber unit is a split copper tube 93, which increases the diameter of the cable to about 0.052" or 1.32 mm. The tubes 92 and 93 form a first metallic component. A PEEK (polyether ether ketone organic polymer thermoplastic) material jacket 94 is disposed about the split copper tube 93, which increases the diameter of the cable to about 0.068" or 1.73 mm. A layer of inner armor wire members 95 comprising about eighteen armor wire members is disposed about the PEEK jacket, which increases the diameter of the cable to about 0.110" or 2.79 mm. The inner armor wire members 95 may be solid armor wire members. A layer of outer armor wire members 96 comprising about seventeen armor wire members is disposed about the inner armor wire layer 95, which increases the diameter of the cable to about 0.155" or 3.94 mm. The outer armor wire members 96 may be 3-strand outer armors or a single solid armor wire of same dimension as the 3-strand outer armors that are embedded in a polymer composite matrix with a smooth outer surface. Each of the armor wire layers 95, 96 can be encased in a polymer material such as the layers 81a and 81b as described hereinabove. The armor wire layers 95, 96 form a second metallic component. A polymer outer jacket 97 is disposed about the outer armor wire layer 96, which increases the final diameter of the cable 90 to about 0.168" or 4.27 mm. Those skilled in the art will appreciate the final diameter of the cable 90 may be greater (such as up to about 0.200" inches or more) or lesser than that described hereinabove.

Figure 10A:
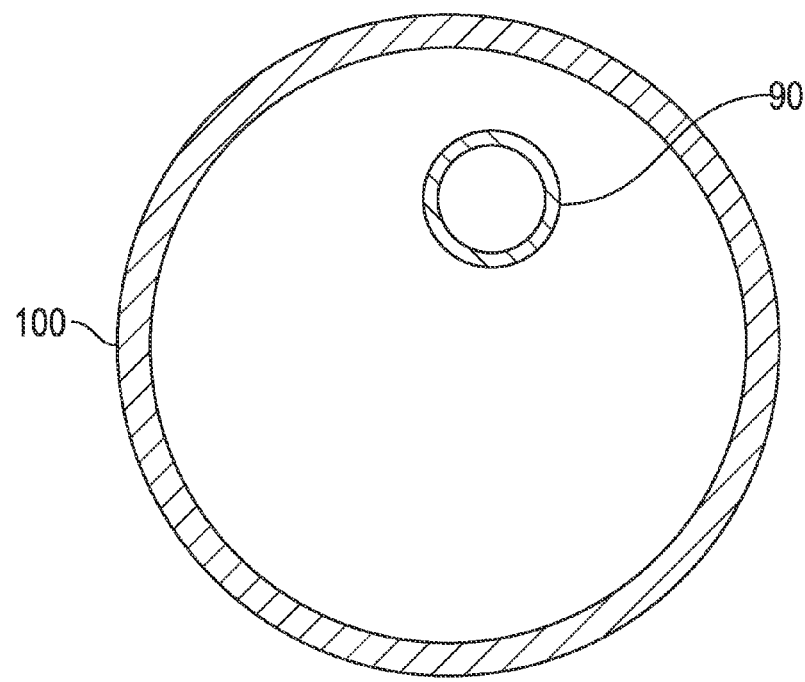
FIG. 10A is a radial cross sectional view of the cable shown in FIG. 9 installed in a coiled tubing and FIG. 10B is a schematic view of a tool attached to the coiled tubing and cable of FIG. 10.
Figure 10B:
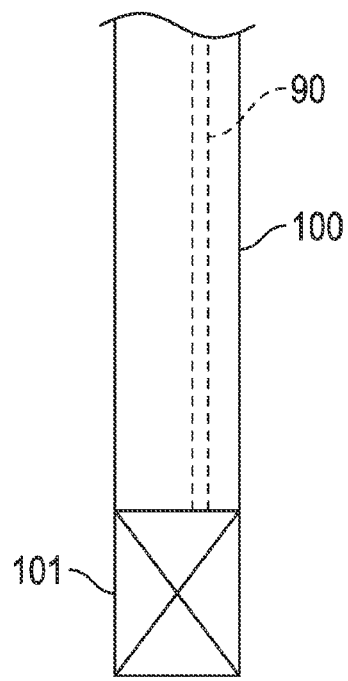

Such a cable 90 as shown in FIG. 9, or any of the cables 10, 20, 20a, 30a, 30b, 40, 50, 60, 80a, 80b and 80c, can be disposed within a length of coiled tubing 100 such as that shown in FIG. 10A, and disposed in a wellbore, as will be appreciated by those skilled in the art. The relatively small exterior or outer diameter of the cable 90 compared to the inner diameter of the coiled tubing 100 (the outer diameter of which is typically between about 2 and ⅛ inches (about 53.9 mm) to about 3 and ¾ inches (about 95.3 mm)), which advantageously does not substantially reduce the amount of internal area or volume within the coiled tubing for performing wellbore operations. The wellbore operation may comprise a coiled tubing operation including, but not limited to, a fluid pumping operation, a fracturing operation, an acidizing operation, a drilling operation. The cable 90 and/or the coiled tubing 100 may be attached to a wellbore device such as a downhole coiled tubing tool 101 or the like, as shown in FIG. 10B. In a non-limiting example, the wellbore device or tool may comprise a measurement device to measure a property and generate an output and an interface device to convert the output from the measurement device to an optical or electrical signal. The property may be any property that can be measured in a borehole such as, but not limited to, pressure, temperature, distributed temperature, pH, amount of precipitate, fluid temperature, depth, chemical luminescence, gamma-ray, resistivity, salinity, fluid flow, fluid compressibility, viscosity, compression, stress, strain, tool location, tool state, tool orientation, and combinations thereof. In some embodiments, the apparatus of the invention may comprise a device to enter a predetermined branch of a multi-lateral well. In particular embodiments, the wellbore may be a multilateral well and the measured property be a tool orientation or a tool position. Types of wellbore devices may comprise a camera, a caliper, a feeler, a casing collar locator, a sensor, a temperature sensor, a chemical sensor, a pressure sensor, a proximity sensor, a resistivity sensor, an electrical sensor, an actuator, an optically activated tool, a chemical analyzer, a flow-measuring device, a valve actuator, a firing head actuator, a tool actuator, a reversing valve, a check valve, and a fluid analyzer. The wellbore device may be provided power and telemetry by the cable 90 or other cables disclosed hereinabove. A variety of wellbore operations may be performed, such as matrix stimulation, fill cleanout, fracturing, scale removal, zonal isolation, perforation, downhole flow control, downhole completion manipulation, well logging, fishing, drilling, milling, measuring a physical property, locating a piece of equipment in the well, locating a particular feature in a wellbore, controlling a valve, and controlling a tool, as will be appreciated by those skilled in the art.

The cable disposed within the coiled tubing may provide telemetry and power for transmitting signals, power, or information from the wellbore to the surface or from the surface to the wellbore for a number of downhole operations and/or tools disposed in the wellbore on the coiled tubing, as will be appreciated by those skilled in the art.

The fiber optic cable embodiments described above provide jacketing/tubing options that include polymeric layers to mitigate the possibility of damage from pinholes. Embodiments disclosed herein provide cables comprising segregated, insulated metallic components that may be used as electrical conductors. The embodiments offer greater protection of optical fibers resulting in decreased signal attenuation and optical fiber failure and are also more resistant to collapse under torque stresses.

The preceding description has been presented with reference to present embodiments. Persons skilled in the art and technology to which this disclosure pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A method for performing an operation in a wellbore penetrating a subterranean formation utilizing a dual use cable for transmitting electrical power and data in wellbore operations, comprising:
    providing a dual use cable, the dual use cable comprising at least one longitudinally extending optical fiber;
    a first metallic component surrounding the at least one optical fiber;
    a polymer material layer surrounding and encasing the first metallic component wherein the at least one optical fiber is adapted to transmit data and the first metallic component is adapted to transmit at least one of electrical power and data; and
    a second metallic component formed as at least one of an outer metallic tube and a plurality of armor wire strength members and another polymer material layer surrounding and encasing the polymer layer material, the second metallic component embedded in the another polymer material layer;
    disposing the dual use cable in a length of coiled tubing; and
    disposing the dual use cable and the coiled tubing in the wellbore; and
    performing at least one wellbore operation with the cable and coiled tubing, wherein the outer diameter of the dual use cable does not substantially reduce the amount of internal area or volume within the coiled tubing for performing the wellbore operation.

2. The method according to claim 1 wherein the at least one optical fiber is positioned in a fiber optic micro-cable having at least another optical fiber.

3. The method according to claim 1 wherein the first metallic component is one of a tube, a split-tube and a slotted armor or copper wire.

4. The method according to claim 1 wherein at least one of the polymer material layer and the another polymer material layer is formed of a CFR-Fluoropolymer, non-reinforced fluoropolymer, or PEEK material.

5. The method according to claim 1 wherein the wellbore operation comprises at least one of a fluid pumping operation, a fracturing operation, an acidizing operation, a drilling operation, and a coiled tubing operation.

6. The method according to claim 1 further comprising encasing the dual use cable having the armor wire strength members embedded in the another polymer material layer in a metallic tube.

7. The method according to claim 1 further comprising forming the first metallic component from an inner split-tube and an outer split-tube spaced apart by a layer of polymer material.

8. The method according to claim 1 further comprising forming the first metallic component from an inner tube and an outer split-tube.

9. A dual use cable for transmitting electrical power and data in wellbore operations, comprising:
  at least one longitudinally extending optical fiber;
  a first metallic component surrounding the at least one optical fiber;
  a polymer material layer surrounding and encasing the first metallic component wherein the at least one optical fiber is adapted to transmit data and the first metallic component is adapted to transmit at least one of electrical power and data; and
  a second metallic component surrounding and encasing the polymer material layer, the second metallic component formed as at least one of an outer metallic tube and a plurality of armor wire strength members embedded in another polymer material layer,
  wherein the dual use cable is disposed within a length of coiled tubing and wherein the outer diameter of the dual use cable does not substantially reduce the amount of internal area or volume within the coiled tubing for performing the wellbore operation.

10. The cable according to claim 9 comprising a plurality of the longitudinally extending optical fibers, the first metallic component being a thin metallic tube, the polymer material layer being formed of a CFR-Fluoropolymer, non-reinforced fluoropolymer, or PEEK material, and the second metallic component being a metallic tube.

11. The cable according to claim 9 wherein the at least one longitudinally extending optical fiber is a fiber optic microcable, the first metallic component is a split-tube, and the second metallic component is two layers of armor wire strength members embedded in polymer material.

12. The cable according to claim 11 further comprising an outer metallic tube surrounding the second metallic component.

13. The cable according to claim 9 further comprising a plurality of the longitudinally extending optical fibers, the first metallic component being a metallic tube, and the second metallic component being two layers of armor wire strength members embedded in polymer material.

14. The cable according to claim 9 further comprising a plurality of the longitudinally extending optical fibers, the first metallic component being a plurality of split-tubes each surrounding an associated one of the optical fibers, and the second metallic component being a layer of armor wire strength members embedded in polymer material.

15. The cable according to claim 9 further comprising a plurality of the longitudinally extending optical fibers, the first metallic component being a plurality of slotted armor wires each receiving an associated one of the optical fibers in a longitudinally extending slot, and the second metallic component being a layer of armor wire strength members embedded in polymer material.

16. The cable according to claim 9 further comprising a plurality of the longitudinally extending optical fibers, the first metallic component being a first split-tube surrounding the optical fibers and a second split-tube surrounding the first split-tube, and the second metallic component being two layers of armor wire strength members embedded in polymer material.

17. The cable according to claim 9 further comprising a plurality of the longitudinally extending optical fibers, the first metallic component being a tube surrounding the optical fibers and a split-tube surrounding the tube, and the second metallic component being two layers of armor wire strength members embedded in polymer material and surrounded by a polymer outer jacket.

18. The cable according to claim 9 wherein the cable is adapted to perform at least one wellbore operation.

19. The cable according to claim 18 wherein the at least one wellbore operation is performed in conjunction with at least one coiled tubing operation.

20. The method according to claim 1 wherein the outer diameter of the cable is about 0.200 inches and an outer diameter of the coiled tubing is at least about 2.125 inches.

* * * * *